US011482777B2

(12) United States Patent
Files et al.

(10) Patent No.: US 11,482,777 B2
(45) Date of Patent: Oct. 25, 2022

(54) INFORMATION HANDLING SYSTEM RADIO ANTENNA SELECTION AND CONTROL

(71) Applicant: Dell Products L.P., Round Rock, TX (US)

(72) Inventors: Jace W. Files, Round Rock, TX (US); John T. Morrison, Round Rock, TX (US); Vinh X. Bui, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 643 days.

(21) Appl. No.: 16/429,339

(22) Filed: Jun. 3, 2019

(65) Prior Publication Data

US 2019/0288388 A1 Sep. 19, 2019

Related U.S. Application Data

(62) Division of application No. 15/134,634, filed on Apr. 21, 2016, now Pat. No. 10,367,263.

(51) Int. Cl.
*H01Q 3/24* (2006.01)
*H04M 1/00* (2006.01)
*H04L 5/00* (2006.01)
*H04M 1/02* (2006.01)
*H01Q 1/22* (2006.01)

(52) U.S. Cl.
CPC ............. *H01Q 3/24* (2013.01); *H01Q 1/2266* (2013.01); *H04L 5/006* (2013.01); *H04M 1/0225* (2013.01); *H04M 1/0243* (2013.01); *H04M 1/0266* (2013.01); *H04M 1/022* (2013.01)

(58) Field of Classification Search
CPC ........ H01Q 1/2266; H01Q 3/24; H04L 5/006; H04M 1/0225; H04M 1/0243; H04M 1/0266
See application file for complete search history.

(56) References Cited

U.S. PATENT DOCUMENTS

| 7,806,333 | B1 * | 10/2010 | McReynolds | ........ G06K 7/0008 235/450 |
| 8,654,030 | B1 | 2/2014 | Mercer | |
| 10,033,087 | B2 | 7/2018 | Sultenfuss et al. | |
| 2014/0361932 | A1 * | 12/2014 | Irci | ........ H01Q 21/28 343/702 |

FOREIGN PATENT DOCUMENTS

EP 2302736 A1 * 3/2011 ............. H01Q 1/243

* cited by examiner

*Primary Examiner* — Dao L Phan
(74) *Attorney, Agent, or Firm* — Zagorin Cave LLP; Robert W. Holland

(57) ABSTRACT

A portable information handling system rotationally couples main and lid housing portions to each other with a hinge having opposing faces. One of a first or second antenna set disposed on the opposing faces is selected to support wireless communication by a radio disposed in the housing based upon the rotational orientation of the hinge. Optimal antenna selection is confirmed by comparing return signal strength indicator or bit rate error of the first and second antenna sets.

6 Claims, 5 Drawing Sheets

INFORMATION HANDLING SYSTEM RADIO ANTENNA SELECTION AND CONTROL

BACKGROUND OF THE INVENTION

Field of the Invention

The present invention relates in general to the field of information handling system wireless communication, and more particularly to an information handling system radio antenna selection and control.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems continue to shrink in size and increase in capability. End users appreciate small portable systems that readily travel so that end users can access information on-the-go. Generally, end users who have to perform input intensive tasks while mobile will rely on portable information handling systems that integrate a keyboard, such as systems that have a convertible or clamshell configuration. For example, convertible and clamshell systems have a main housing portion that contains processing components and a lid housing portion that contains a display. End users can make inputs to the information handling system through a touch screen of the display or through an integrated mechanical keyboard that is typically located on an upper surface of the main housing portion. The main and lid housing portions rotationally couple to each other with a hinge that supports the display in a viewing position relative to the integrated keyboard. In convertible systems, the housing portions rotate 360 degrees relative to each other so that the display is exposed for use as a tablet. Various types of convertible portable information handling systems assemble processing components, an integrated keyboard and display in a variety of other arrangements. For example, some tablet information handling system couple and decouple to a main housing portion for use as a tablet separate from the main housing portion. Such system include processing components in the lid portion and communicate through a wired or wireless interface with a main housing portion that integrates the keyboard and supporting processing components.

Generally, a portable information handling system length and width is determined by the size of the display integrated in the housing. End users generally pick a portable information handling system based on a desired display size, however, end users expect to have as much performance as possible packed into a housing that is as light weight and thin as possible. Decreasing information handling system housing height and improving ergonomics associated with typed inputs at a minimalist housing presents a number of difficulties. For example, to include adequate processing power, thermal constraints drive processor placement and housing form factor. Often, ergonomic constraints and the desire for robust housing mechanics lead to housing designs that have narrow top and side borders with added strength focused near the hinge assembly that rotationally couples the main and lid housing portions to each other. Other processing components are generally placed in the housing portions as space allows with some compromises accepted to performance where required.

One consideration for portable information handling systems is that end users rely heavily upon wireless communication to interact with networks and peripheral devices. Indeed, portable information handling system often have limited numbers of ports for transferring data a power so that wireless communication is the primary interface for performing most information handling system operations. One difficulty with the use of wireless communications is that the efficiency of antennae integrated in the information handling system tends to vary considerably based upon the placement of the antennae and the operating configuration of housing portions. Conventional antenna placement is generally in the lid portion opposite the hinges so that wireless signals have a clear path out of the information handling system. However, thin height housings restrict space available for antenna placement. Suboptimal antenna placement can lead to a poor user experience with performance varying dramatically based upon the system's configuration.

SUMMARY OF THE INVENTION

Therefore, a need has arisen for a system and method which provides an information handling system low profile housing that provides wireless antenna performance under varying operating configurations.

In accordance with the present invention, a system and method are provided which substantially reduce the disadvantages and problems associated with previous methods and systems for wireless antenna placement and operation with rotationally coupled portable information handling system housing portions. First and second antenna disposed on opposing sides of a hinge selectively support wireless communication based at least in part on the hinge orientation.

More specifically, a portable information handling system is built with main and lid housing portions rotationally coupled to each other by a hinge, such as with processing components disposed in the main housing portion and a display disposed in the lid housing portion. A radio disposed in the housing supports wireless communication between the processing components and external devices, such as through wireless wide area, local area and personal area networks. The hinge couples to the main and lid housing portions to have opposing faces that shift in orientation relative to the housing portions as the housing portions rotate relative to each other. A first antenna set of plural antennae couple to a first face of the hinge and a second antenna set of plural antennae couple to a second face of the hinge opposite the first face. As the housing portions rotate relative to each other, the opposing faces move between a first housing orientation having the first antenna set in a preferred position for wireless communication on the first hinge face to a second housing orientation having the second antenna set in a preferred position for wireless communication on the second hinge face. The radio selects one of the first or second antenna sets to perform wireless communication based upon the housing orientation. Further analysis may then be performed to confirm that an optimal antenna set is selected, such as by comparing the return signal strength indicator (RSSI) or bit rate error (BRE) associated with wireless communication by one or more the antenna of each antenna set. Further improvements in antenna efficiency are achieved by altering the operation of unselected antenna, such as by detuning the unselected antenna or interfacing an unselected antenna to ground.

The present invention provides a number of important technical advantages. One example of an important technical advantage is that antennae placed proximate a hinge assembly provide improved wireless performance in varying operational configurations. Locating antennae proximate the hinge provides enhanced robustness for mounting and reduces wiring and cables associated with placing antenna distal the radio, such as coaxial cables that would run through the minimal space provided under a thin touchscreen display. Reduced cable length provides improve radio frequency signal loss and less difficulty balancing impedance across cable paths that may vary in housings of different dimensions. Opposing antennae located at the outer surface of a hinge assembly allows selection of an antenna for use that has the best efficiency based sensed factors, like housing position and RSSI, while also using the inactive antenna as a ground for directing RF energy.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Antenna sets disposed in a hinge of a portable information handling system are selected to support wireless communication based at least in part upon housing orientation that alters the relative hinge positions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
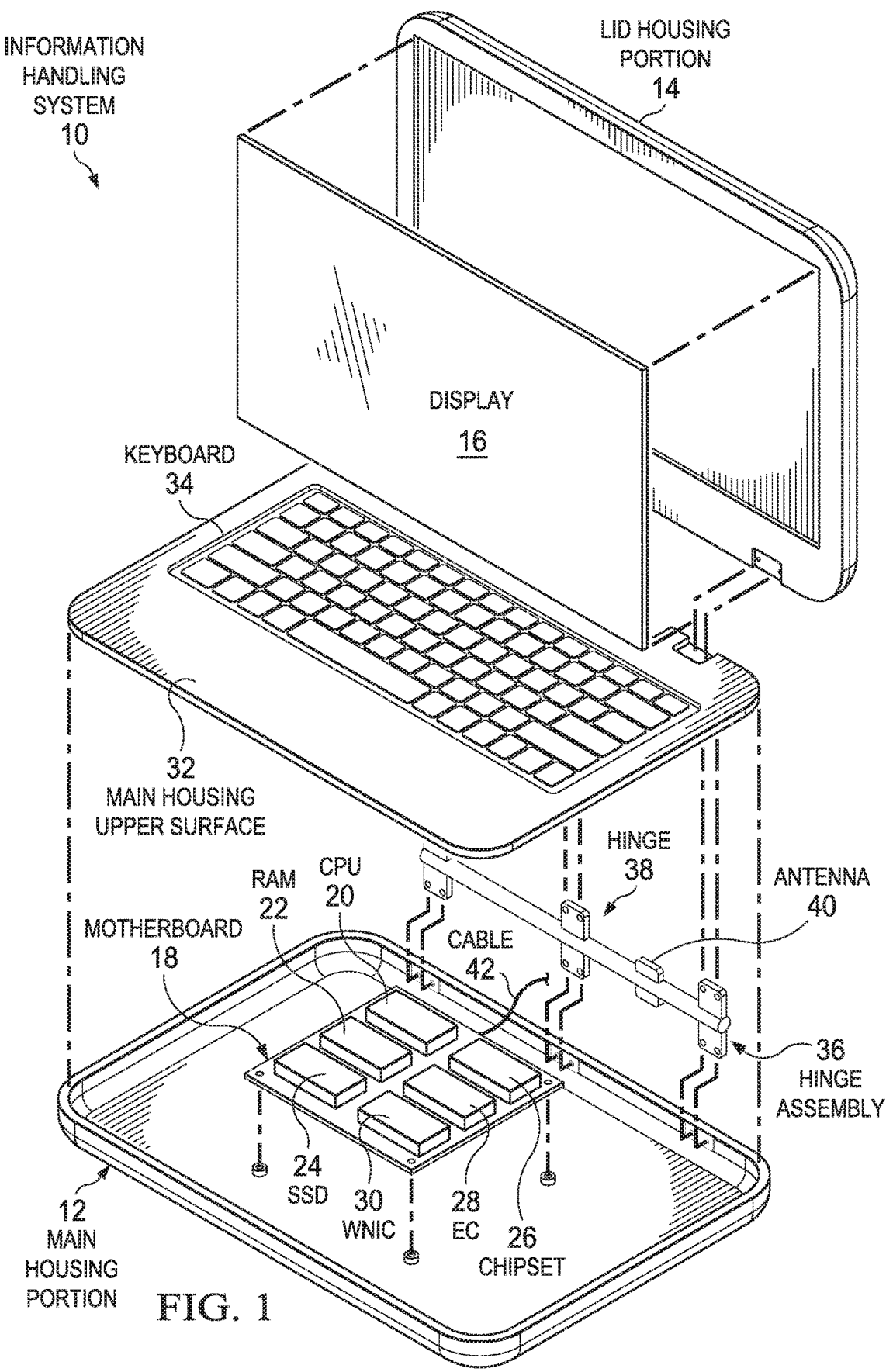
FIG. 1 depicts a blown-up view of a portable information handling system having first and second antenna disposed on opposing faces of a hinge that rotationally couples main and lid housing portions relative to each other.

Referring now to FIG. 1, a blown-up view depicts a portable information handling system 10 having first and second antenna 40 disposed on opposing faces of a hinge 38 that rotationally couples main and lid housing portions relative to each other. In the example embodiment, portable information handling system 10 has a main housing portion 12 and a lid housing portion 14 rotationally coupled to each other by a hinge assembly 36 so that lid housing portion 14 holds an integrated display 16 in an elevated position for end user viewing. Main housing portion 14 holds processing components that cooperate to process information. In the example embodiment, a motherboard 18 interfaces a central processing unit (CPU) 20 and random access memory (RAM) 22 to execute instructions for processing information. For example, the instructions are provided from one or more applications stored in persistent memory, such as a solid state drive (SSD) 24. A chipset includes controllers and flash memory to executed firmware that coordinates operation of the processing components, such as a Basic Input/Output System (BIOS). An embedded controller 28 provides an interface between human interface devices and CPU 20, such as keyboard, mouse and touchscreen input devices. A wireless network interface card (WNIC) 30 supports wireless communication, such as through a wireless local area network (WLAN), a wireless wide area network (WWAN) and/or a wireless personal area network (WPAN). Motherboard 18 is integrated in main housing portion 12 and covered by a main housing upper surface 32 having an integrated keyboard 34. In alternative embodiments, alternative types of configurations may be used, such as by integrated processing components within lid housing portion 14 under display 16 to provide a detachable tablet.

After assembly, portable information handling system 10 interfaces WNIC 30 with antenna 40 through a cable 42, such as a coaxial cable that provides wireless signal communication. Main housing portion 12 and lid housing portion 14 rotate relative to each other around hinge assembly 36. For example, hinge assembly 36 includes synchronized hinges 38 that translate rotation motion between main housing portion 12 and lid housing portion 14 with gears or other synchronization mechanisms. As a result, the relative position of antenna 40 to the main and lid housing portions relates to the rotational orientation of hinge assembly 36. WNIC 30 selects one of plural antenna 40 (or plural sets of antenna as set forth below) based upon the location of the antenna relative to the main and lid housing portions. For example, a sensor associated with hinge assembly 36 provides relative rotational location to WNIC 30 to allow WNIC 30 to select an antenna 40 that is aligned to provide unobstructed communication to an external wireless device. In alternative embodiments, other types of sensors may be used to determine hinge assembly 36 relative rotational position, such as Hall sensors and magnets that determine proximity of upper and lower sides of main and lid housing portions relative to each other, or accelerometers that determine relative orientation to gravity of main and lid housing portions.

Figure 2:
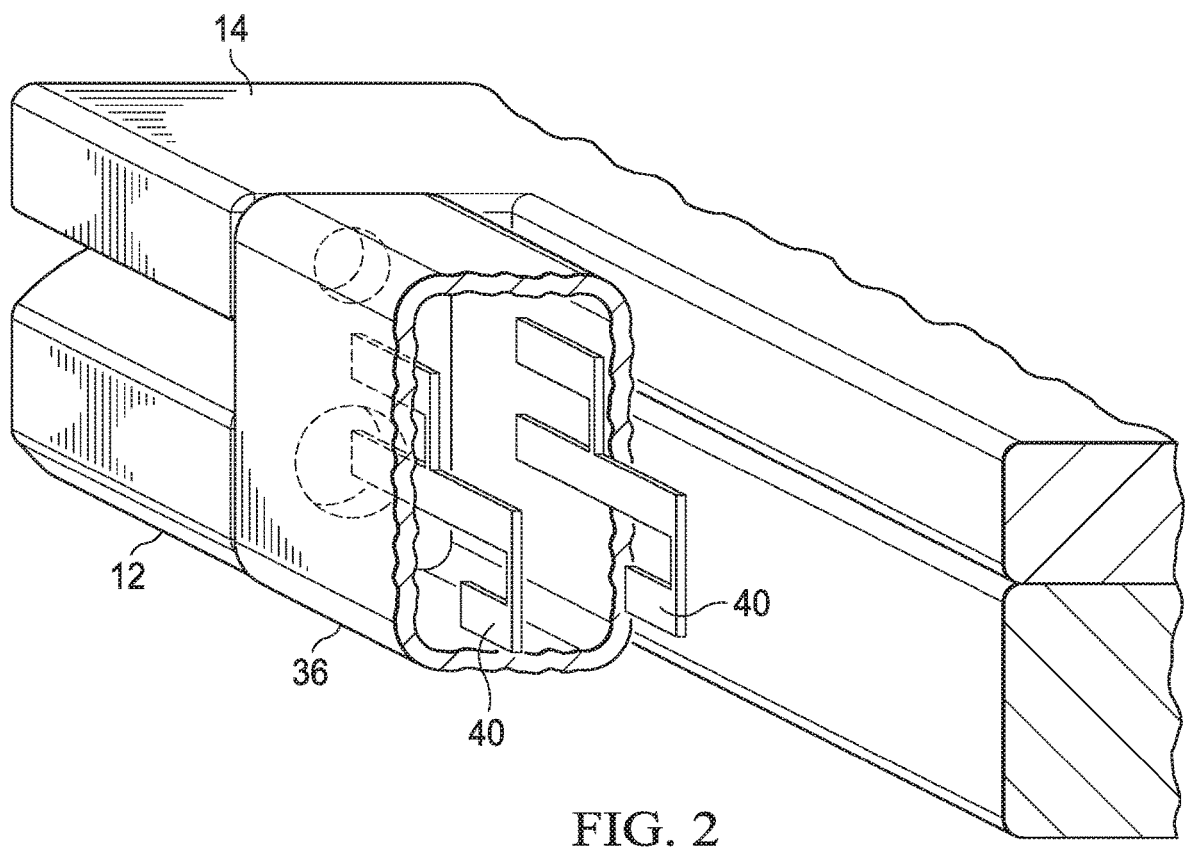
FIG. 2 depicts a side perspective cutaway view of first and second antennae oriented relative to each other with main and lid housing portions in a closed position.

Referring now to FIG. 2, a side perspective cutaway view depicts first and second antennae 40 oriented relative to each other with main 12 and lid 14 housing portions in a closed position. Antenna 40 are disposed on opposing faces of hinge assembly 34 so that, in the closed position, one antenna 40 is located at the outer periphery of information handling system 10 while the opposing antenna 40 is in an internal position. As lid housing portion 14 rotates relative to lid main portion 12 from the closed to an open position, the relative orientation of hinge assembly 34 changes, resulting in changes to the relative position of antenna 40.

Figure 3:
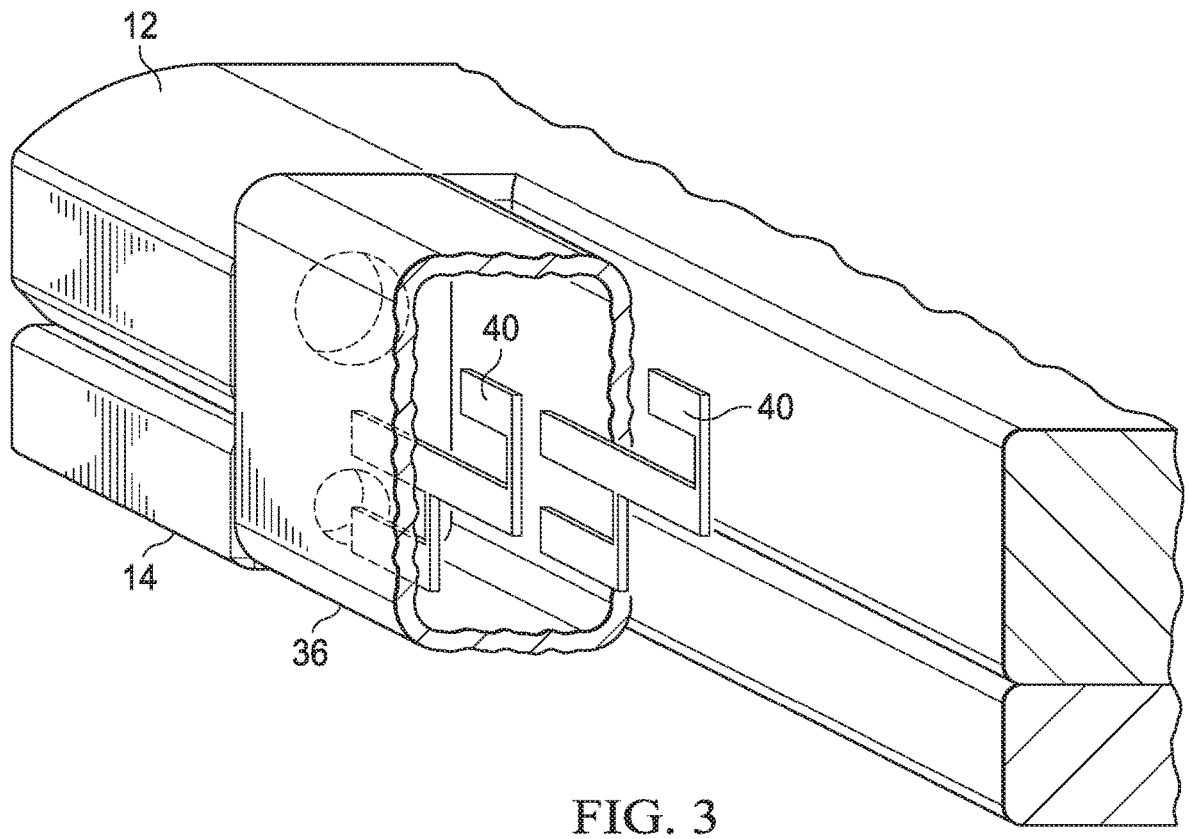
FIG. 3 depicts a side perspective cutaway view of first and second antennae oriented relative to each other with main and lid housing portions in a tablet position.
Figure 4:
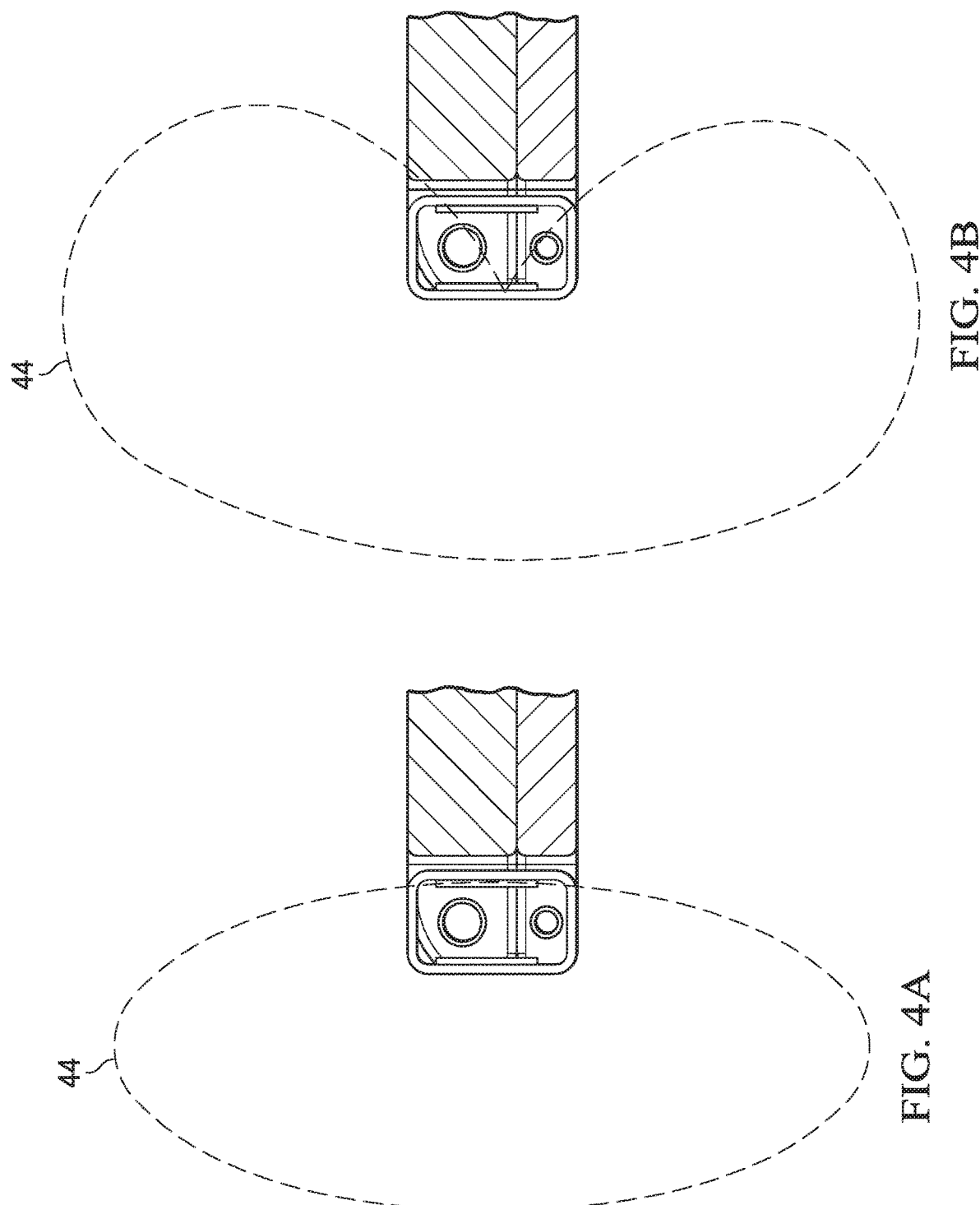
FIGS. 4A and 4B depict radiation patterns extending from a portable information handling system having restricted and optimized antenna configurations.

Referring now to FIG. 3, a side perspective cutaway view depicts first and second antennae 40 oriented relative to each other with main 12 and lid 14 housing portions in a tablet position. Rotation of hinge assembly 34 during transition from the closed to the tablet configurations has moved the outer antenna 40 shown in the closed configuration to an inner position in the tablet configuration, and has moved the inner antenna 40 shown in the closed configuration to an outer periphery position in the tablet configuration. As depicted by FIGS. 4A and 4B, radiation patterns extending from a portable information handling system 10 are impacted by the relative location of antenna 40 to the housing periphery. FIG. 4A depicts a restricted radiation pattern that is transmitted from an antenna on an inner hinge face where housing structure interferes with radio frequency energy. In contrast, FIG. 4B depicts an optimized radiation pattern 44 transmitted from an antenna located at an outer face of hinge assembly 34 with greater radio frequency efficiency provided by reduced housing structure interference.

In the example embodiment depicted by FIG. 3, each opposing face of hinge assembly 36 has three evenly spaced antenna 40 that act as one set under the control of a radio in WNIC 30. Other types of configurations of antenna 40 may be used, such as a 2×2 configuration or an irregular spacing of antenna 40 across the face of hinge assembly 36. In various embodiments, WNIC 30 uses one, two or all three of the antenna 40 on the outer periphery of hinge assembly 36 to communicate wireless signals. The antenna 40 on the inner face of hinge assembly 36 when not in use may be altered to provide other functions. For example, inner face antenna 40 may be de-tuned from the frequency used by WNIC 30 to avoid resonance with signals that transmit from antenna 40 on the outer face. Alternatively, one or more of inner face antenna 40 may be tuned to resonate at the transmitting frequency to absorb and retransmit RF energy as a passive conductive element, such as for providing directional control of radiated energy. As another alternative, one or more inactive antenna 40 on the inner face of hinge assembly 36 may be grounded to act as a ground for enhancing or shaping the RF energy transmitted from a selected antenna 40. In another alternative embodiment, selection of antenna 40 is initially performed based upon the orientation of hinge assembly 36 and then adjusted based upon antenna performance. For example, WNIC 30 tests radio performance to determine which antenna 40 or set of antenna 40 provides the best return signal strength indication (RSSI) and uses the antenna 40 configuration with the best RSSI. As an alternative to RSSI, WNIC 30 performs an analysis based on bit rate error (BRE) and selects the antenna or set of antenna that provides the best BRE. In one embodiment, the selection of an antenna set to perform wireless communication is based upon the distance of each antenna set from the ground plane of WNIC 30, with greater distance to ground providing improved antenna efficiency.

Figure 5:
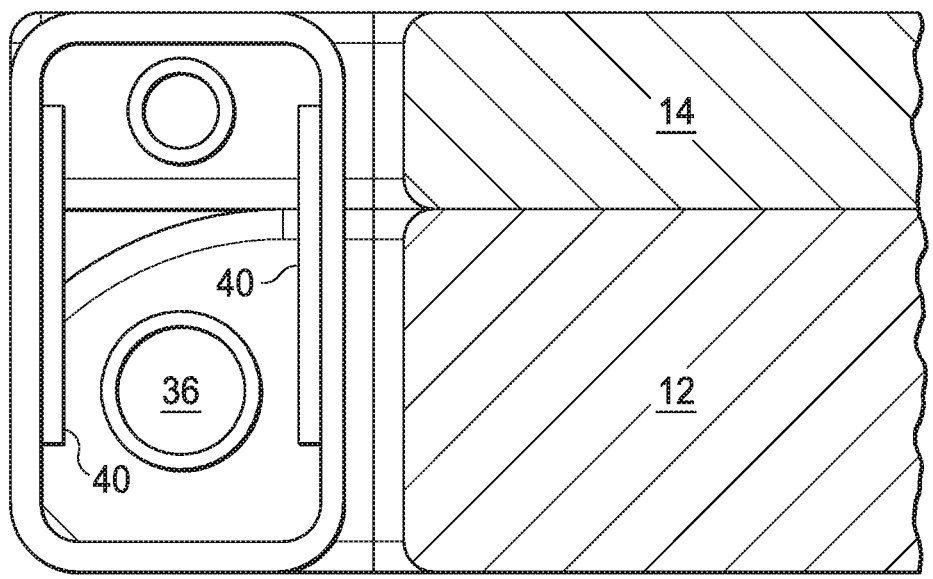
FIG. 5 depicts a side cutaway view of first and second antenna coupled to opposing faces of a hinge.

Referring now to FIG. 5 depicts a side cutaway view depicts first and second antenna 40 coupled to opposing faces of a hinge 36. In one example embodiment, the antenna 40 located on the interior face of hinge 36 has a distance of approximately 1.5 mm from the ground plane, while the antenna 40 on the outer face of hinge 36 has a distance of approximated 6.5 mm to the ground plane. The greater distance between an antenna 40 and a ground plane tends to provide better antenna efficiency. In addition, antenna 40 on the outer face of hinge 30 has less obstruction caused by the housing surface. Although the example embodiment depicts first and second set of antenna 40 on opposing faces, in an alternative embodiment, additional antenna 40 may be included on other faces of hinge 36 and may include non-parallel and non-perpendicular orientations that provide greater variations is antenna performance for intermediate rotational orientations, such as 90 degrees of orientation in a clamshell configuration or 270 degrees of orientation in a tablet stand orientation.

Figure 6:
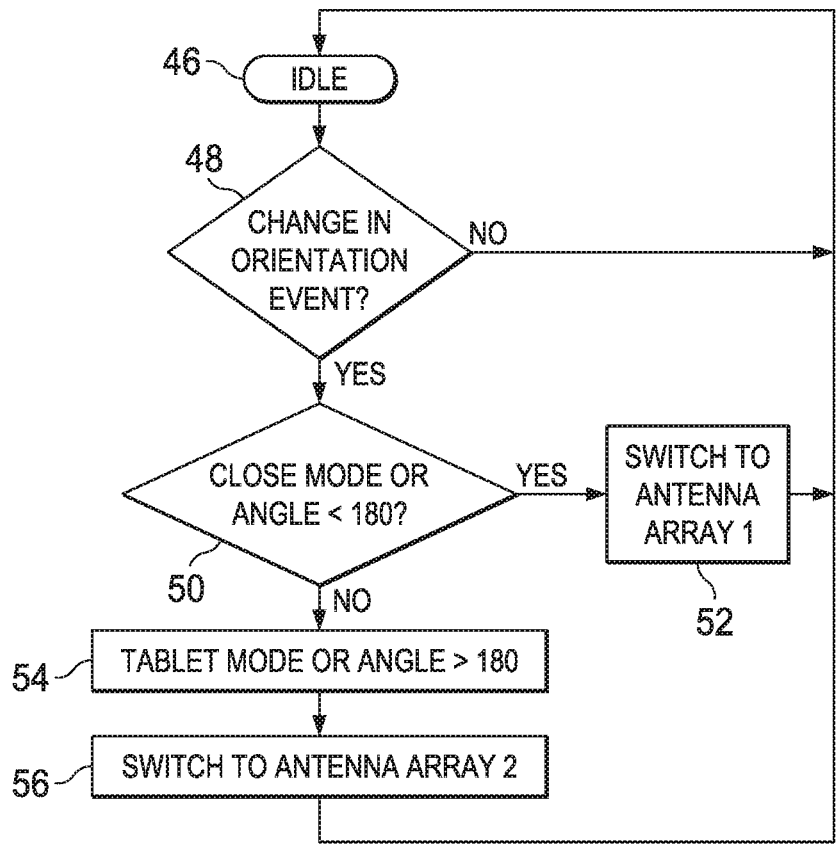
FIG. 6 depicts a flow diagram of a process for selecting an antenna based upon housing orientation.

Referring now to FIG. 6, a flow diagram depicts a process for selecting an antenna 4C) based upon housing orientation. The process starts at step 46 in an idle state awaiting a change in housing configuration. At step 48, a determination is made if a change housing orientation is detected and, if not, the process returns to step 46. If a change in housing orientation is detected, the process continues to step 50 to determine if the change is to a closed mode or to an open mode. If the housing configuration is changed to an open configuration, the process continues to step 54 to confirm that the lid and main housing portions have rotated greater than 180 degrees, such as to a tablet configuration. If the configuration has opened to a tablet mode or greater than 180 degrees of rotation, the process continues to step 56 to select the antenna array located at the outer face of the hinge assembly at the relative housing rotation, then the process returns to step 46 to continue monitoring for changes in housing configuration. If at step 50, the relative housing configuration remains less than 180 degrees of rotation, the process continues to step 52 to select the antenna set associated with the outer hinge face at less than 180 degrees of rotation, and then the process returns to step 46.

Figure 7:
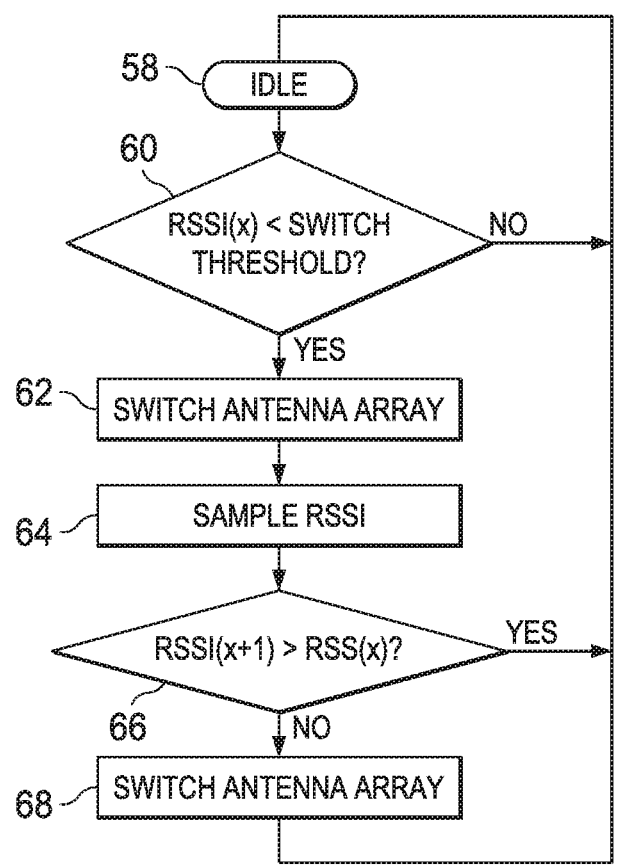
FIG. 7 depicts a flow diagram of a process for selecting an antenna return signal strength and/or bit rate error.

Referring now to FIG. 7, a flow diagram depicts a process for selecting an antenna based upon return signal strength and/or bit rate error. Although housing rotation orientation provides selection of an antenna set that likely has the best efficiency, in some instances other factors may impact actual antenna performance. The process starts at step 58 in an idle state monitoring RSSI (and/or alternatively BER). At step 60, a determination is made of whether RSSI (and/or BRE) has reached a threshold level. If not, the process returns to step 58. If a threshold is reached that indicates a drop in antenna performance, the process continues to step 62 to select the other antenna array, even if the relative rotational position of the other antenna array is associated with an expected worse antenna performance. At step 64, the RSSI (and/or BRE) of the newly selected antenna is compared with the RSSI (and/or BRE) of the previously selected antenna. If the newly selected antenna provides improved antenna efficiency, the process returns to step 58 with the newly selected antenna enabled to provide wireless communication. If the newly selected antenna does not provide better performance, the process continues to step 68 to select the previous antenna and to step 58 to continue wireless communication with the original antenna. In alternative embodiments, similar comparison of antenna performance may be done based upon implementation of a non-selected antenna in a detuned state, a tuned state or a ground state.

Although the present invention has been described in detail, it should be understood that various changes, substitutions and alterations can be made hereto without departing from the spirit and scope of the invention as defined by the appended claims.

What is claimed is:

1. A method for communicating wireless signals at a portable information handling system, the method comprising:

rotationally coupling main and lid housing portions to each other with a hinge having first and second opposing faces;

disposing first and second antenna sets on the hinge first and second opposing faces;

determining the relative rotational positions of the lid and main housing portions to each other; and in response to the determining, selecting one of the first or second antenna sets to communicate wireless signals.

2. The method of claim 1 further comprising:

detecting bit rate error associated with the selected and unselected antenna sets; and selecting the unselected antenna set if the unselected antenna set has a lower bit rate error.

3. The method of claim 2 further comprising:

detecting a return signal strength indicator associated with the selected and unselected antenna sets; and selecting the unselected antenna set if the unselected antenna set has a greater return signal strength indicator.

4. The method of claim 3 wherein the determining further comprises selecting the antenna set having a furthest distance to a ground plane of the information handling system.

5. The method of claim 1 wherein the first antenna set comprises three antenna disposed at spaced locations along the first hinge face.

6. The method of claim 1 further comprising detuning the unselected antenna set.

\* \* \* \* \*